Figure 1:
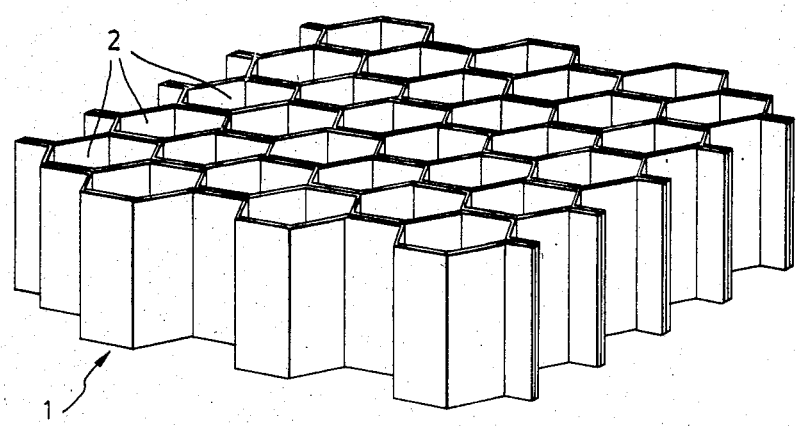

United States Patent [19]

Katila et al.

[11] Patent Number: 4,578,899
[45] Date of Patent: Apr. 1, 1986

[54] SET OF GROWING CELLS FOR THE GROWING OF PLANTS

[75] Inventors: Matti Katila; Jukka Erkkilä, both of Säkylä, Finland

[73] Assignee: Lannen Tehtaat Oy, Iso-Vimma, Finland

[21] Appl. No.: 552,431

[22] Filed: Nov. 16, 1983

[30] Foreign Application Priority Data

Nov. 16, 1982 [FI] Finland .................................. 823929

[51] Int. Cl.⁴ ............................................ A01G 23/02
[52] U.S. Cl. ........................................................ 47/86
[58] Field of Search .................... 47/73, 74, 77, 87; 428/116–118, 73; 229/28 R, 29 D, 15

[56] References Cited

U.S. PATENT DOCUMENTS

| | | | |
|---|---|---|---|
| 3,164,507 | 1/1965 | Masuda | 47/77 X |
| 3,389,748 | 6/1968 | Hitchens | 428/116 X |
| 3,515,036 | 6/1970 | Takehiro et al. | 47/77 X |
| 3,834,074 | 9/1974 | Shirouzu | 428/116 X |
| 4,132,337 | 1/1979 | Masuda et al. | 47/77 X |
| 4,231,186 | 11/1980 | Ruuska | 47/74 |
| 4,242,161 | 12/1980 | Hulten et al. | 47/77 X |
| 4,328,641 | 5/1982 | Tesch | 47/77 X |
| 4,453,344 | 6/1984 | Van Wingerden | 47/77 X |

FOREIGN PATENT DOCUMENTS

396267 11/1976 Sweden.
1207858 10/1970 United Kingdom.
534197 12/1976 U.S.S.R..

*Primary Examiner*—Robert A. Hafer
*Assistant Examiner*—Danton DeMille
*Attorney, Agent, or Firm*—Burns, Doane, Swecker & Mathis

[57] ABSTRACT

Set of growing cells (1) for the growing of plants, the said set of growing cells (1) comprising several lines of pots parallel to each other. Each of the lines of pots adjoining each other has a common wall construction (3) partly decomposing during the growing of the plants, the said wall construction consisting of three material layers laminated together.

The middle portion (5) of the wall construction (3) is composed of a plastic material, such as, e.g., polyethylene or polypropylene.

On both sides of the middle portion (5) of the wall construction (3), there is a thin paper layer (6) decomposing in the ground during the growing of the plants. After the stage of growing of the plants, after decomposition of the paper layers (6), the adhesive strips (4), which do not adhere to the plastic layers, i.e. to the middle portions (5), remain as plugs between the middle portions (5).

7 Claims, 3 Drawing Figures

SET OF GROWING CELLS FOR THE GROWING OF PLANTS

The present invention is concerned with a set of growing cells for the growing of plants, the said set of growing cells comprising several lines of pots parallel to each other, each of which lines of pots adjoining each other has a common wall construction partly decomposing during the growing of the plants, the said wall construction consisting of three material layers laminated together.

It is a particular objective of the invention to provide a set of growing cells intended for the production of pot plants, whereat the casing defining the plant cake is removed before planting and does therefore not hamper the growth of the roots after planting.

In prior art, e.g., solid sets of cells have been used, made of plastic by extruding or deep-drawing. When empty, such sets of cells require a lot of space during storage, and they must also be transported away from the planting site. On the other hand, plant cakes made of compressed material or of binder material are suitable for vegetable plants only, because they do not stand transfers and trasportations.

For the production of pot plants, several cell systems or paper and/or plastic have also been developed. Such cell systems are described, e.g., in the following patent publications: FI No. 51,416, SE No. 362,340, SE No. 396,267, and SU No. 534,197. In such sets of cells, a problem frequently encountered is the growing of roots from one pot into the other. This is prevented by glueing plastic layers into contact with each other, but in such a case, the disassembly of the cell system must be carried out be tearing.

The object of the present invention is to eliminate the above drawbacks and to provide a set of growing cells for growing a pot plant without an outside casing. The set of planting pots in accordance with the invention is mainly characterized in that the middle portion of the wall structure consists of a plastic material, such as, e.g., polyethylene of polypropylene, and that on both sides of the middle portion of the wall structure, there is a thin paper layer decomposing in the ground during the growing of the plants.

Figure 2:
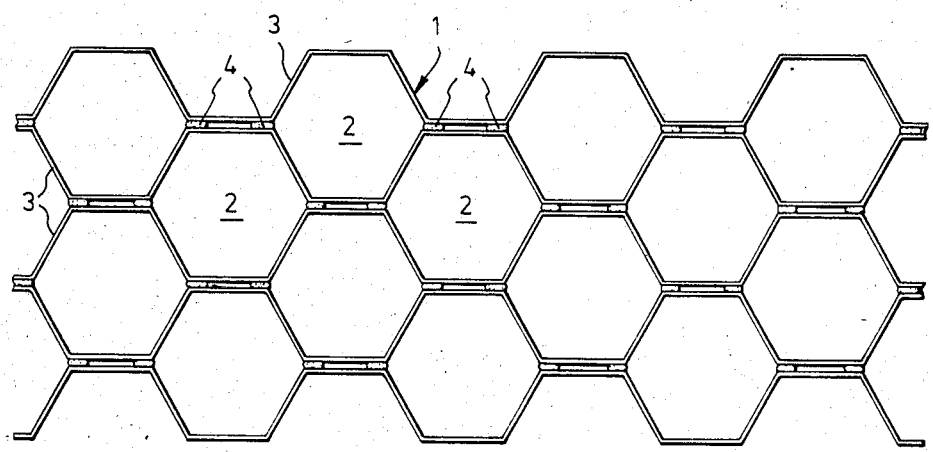
Figure 3:
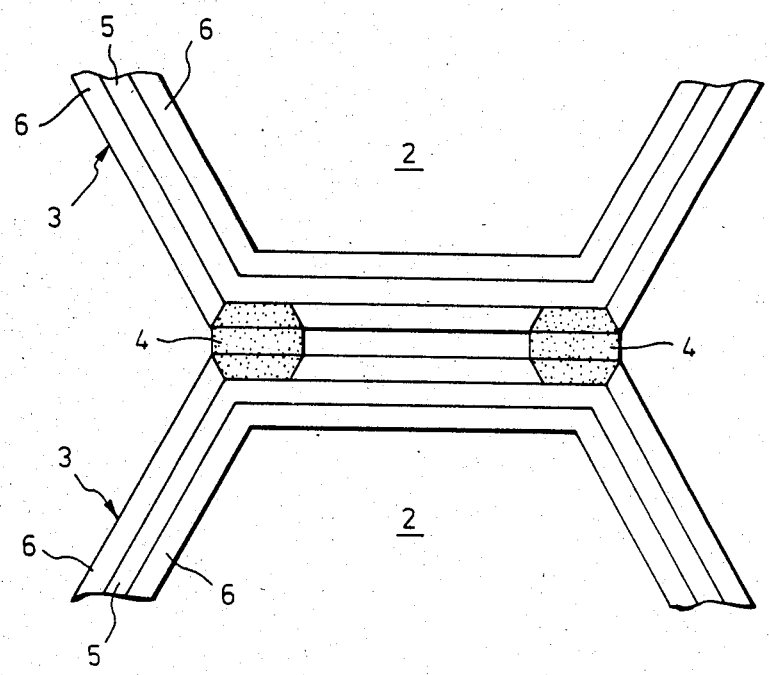

The invention comes out in more detail from the following description and from the attached drawings, wherein FIG. 1 is a perspective view of the set of growing cells, FIG. 2 shows the set of growing cells of FIG. 1 as viewed from above, and FIG. 3 is an enlarged view of the fastening of the wall structures together.

The wall structures or partitions 3 in the set of growing cells 1 consist of three layers. They comprise a middle portion 5 made of a plastic material, a thin layer of paper 6 being laminated at both sides of the said middle portion. The plastic material of the middle portion is, e.g., polyethylene or polypropylene. The thickness of the middle portion 5 is 10 to 50 $g/m^2$, preferably 20 to 30 $g/m^2$, and the thickness of the paper layers 6 is 15 to 30 $g/m^2$, preferably 20 to 25 $g/m^2$.

The set of plant cells 1 is produced by forming glue strips on multi-layer laminates and by stacking them one above the other. By varying the width and location of the glue strips, it is possible to produce sets of cells of different forms and sizes. Normally, the glue pattern is such that the cells formed have a shape of a quadrangle or hexagon.

In the example case shown in FIGS. 1 to 3, the wall structures of the set of growing cells 1 have been glued together so that cells or pots 1 of the shape of a regular hexagon are formed. As glue is used either a hot-melt adhesive, dispersion adhesives, or other adhesives insoluble in water, whereat the paper 6 is thoroughly impregnated at the glue area. The adhesive does, however, not adhere through the paper layers 6 to the middle portions 5 of the wall structures 3 of plastic. The adhesive material is non-decomposing and insoluble in water. Under these circumstances, during the growing of the plants, after decomposition of the paper layers 6, the adhesive strips 4 remain as plugs between the plastic layers, i.e. middle portions 5, whereat they prevent growing of the roots from one pot 2 into the other along the joint. After the stage of growing of the plants, it is easy to remove the pot plants from the set of growing cells 1, for at that time, only the loose middle portions 5, in the form of plastic tape, are meandering between the pot plants, being separate from each other.

What is claimed is:

1. A structure providing a set of growing cells for the growing of plants, said structure comprising:
    a plurality of undulating partitions having a height, each comprising a layer of substantially root-impenetrable, plastic material and a layer of decomposable paper laminated upon each side of said plastic layer, said partitions being placed parallel to one another such that spaced apart portions of adjacent partitions define a row of growing cells therebetween; and
    a plurality of plugs of adjesive material between juxtaposed portions of adjacent partitions for gluing the adjacent partitions temporarily together, the plugs being interposed between growing cells of each row and extending along at least a portion of said height so as to block root growth from one growing cell into another of the same row, said adhesive material being non-decomposing and insoluble in water, said adhesive material impregnating paper layers of adjacent partitions without substantial adherence to the plastic layers of said adjacent partitions so that the plastic layers may be stripped away from each other after the paper layers have decomposed so to release the plants free of said structure.

2. The structure as claimed in claim 1, wherein an agent controlling the growth of the roots has been added to the adhesive material, so that the roots of the plant avoid the plugs and do not grow from one cell into the other.

3. The structure as claimed in claim 1, wherein at least two plugs are interposed between each pair of growing cells of the same row and a chemical controlling the growth of the roots has been impregnated between the at least two plugs.

4. The structure as claimed in claim 1, wherein the thickness of the paper layers is in the range of 15 to 30 $g/m^2$.

5. The structure as claimed in claim 4 wherein the thickness of the plastic layer is in the range of 10 to 50 $g/m^2$.

6. The structure as claimed in claim 1, wherein the plastic material is polyethylene.

7. The structure as claimed in claim 1, wherein the plastic material is polypropylene.

* * * * *